UNITED STATES PATENT OFFICE.

ALFRED HOLDSWORTH, OF BARNSBURY, LONDON, ENGLAND.

METHOD OF TREATING POOR SULFID ORES.

938,055.   Specification of Letters Patent.   Patented Oct. 26, 1909.

No Drawing.   Application filed November 1, 1907.   Serial No. 400,301.

*To all whom it may concern:*

Be it known that I, ALFRED HOLDSWORTH, a subject of the King of Great Britain, residing at 11 Ashley House, Upper Park street, Barnsbury, London, England, have invented a new and useful Improved Method of Treating Poor Sulfid Ores; and I do hereby declare that the following is a full, clear, and exact description of the invention, which will enable others skilled in the art to which it appertains to make and use the same.

My invention relates to an improved process for the treatment of poor sulfid ores.

As is well known most sulfid ores, especially the sulfid of zinc, have to be roasted or calcined before they can be submitted to any process for the obtaining of the useful and valuable metal present in them or for the preparation of any marketable compound or compounds of such metal or metals. Owing to the expense involved for fuel, labor and plant for such roasting or calcination, ores containing only a low percentage of useful or valuable metals cannot be profitably treated and at nearly every mine heaps of such low-grade ores, separated by various processes from the richer portions, have accumulated as waste or "tailings". Other ore deposits are too poor to be worked even for their richest portions. There are thus vast quantities of ore and mineral deposits which cannot be profitably worked by any of the hitherto known and usual processes. It has been proposed to treat such ores by mixing them with sulfuric acid and subjecting to heat, but hitherto such processes have not met with commercial success.

According to my invention the material after it has been crushed or pulverized to the requisite degree of fineness, is mixed with such an amount of sulfuric acid as is indicated by the composition of the ore material as determined by analysis and which must be chemically equivalent or correspond to the sulfur present, that is to say in the proportion of one molecule of sulfuric acid to each atom of sulfur. Where carbonates, oxids or other compounds have to be decomposed as well as sulfids, a larger quantity of acid than that exactly corresponding to the amount of sulfur may have to be employed. As in most cases sulfuric acid is produced or liberated during the subsequent roasting, calcining or heating, I find the amount of acid chemically equivalent to the sulfur present in the ore material to be a very close approximation to the amount actually required.

In general the acid used is a fairly strong acid of say about 60° Baumé but as it is essential that the acid should be as evenly distributed throughout the mass as possible the admixture with the said acid may be effected in either of the following ways:—

(a) Where the material to be treated contains a large proportion of matter that it is either impossible or undesirable to decompose by the action of the sulfuric acid, and where as a consequence the amount of acid to be used may not be sufficient to wet the whole mass or make a homogeneous mixture with it, I propose to use with the acid such an amount of water as may make a thoroughly homogeneous mixture.

(b) Where the nature of the ore material demands a large volume of the strong acid, so that if all the necessary acid were added at once a mixture would be obtained that was too wet or semi-liquid instead of a stiff manageable or dry mixture, I may add the acid in two or more portions, so as to get a stiff and fairly dry mixture. If the interaction of the added portion of acid and the ore material does not speedily produce a stiff dry mixture, I may hasten such result by drying, heating or even calcining before adding more acid. The mixing may advantageously take place on heated floors or in heated tanks and with many ores no further heating will be necessary.

The object of the above described admixture with sulfuric acid is to convert into sulfates all the metals which it is desirable to recover or remove from the ore by leaching, and also to convert into sulfates all the metals which must be so converted along with the metals I desire to remove or recover.

After mixing with the acid and after the lapse of any time that may be necessary for the action of the acid on the ore material to proceed to such an extent as may be desirable before heating, the mixture is heated at such a temperature and for such a time as the nature of the original ore material may indicate. It is not possible to give general indications as to either time or temperature. The following example will, however, serve to illustrate the mode of carrying out my invention.

Assume that it be desired to extract the silver from a mineral containing a large proportion of the sulfids of iron and copper and a comparatively small proportion of silver sulfid, the pulverized material is treated with sulfuric acid as above described so as to convert all the metals contained in it into sulfates. The whole mass is then heated to a temperature sufficiently high to decompose the sulfates of iron and copper and drive off sulfur trioxid, sulfur dioxid and oxygen and leave a residue of the oxids of iron and copper and undecomposed sulfate of silver. By subsequent leaching with water all the silver may be extracted as sulfate. The time and temperature of ignition having been regulated so as to render the oxid of iron unattackable by acids of moderate strength the undissolved residue may be treated with moderately dilute sulfuric (or other) acid so as to remove practically all the copper. Each metal might require different degrees and duration of heating or calcining.

The heating or calcining may be carried out in various ways viz., in an ordinary reverberatory furnace, in muffles or in furnaces or in calciners or on drying floors. In any case all the escaping sulfuric acid and sulfur trioxid may be collected and by carrying on the calcination, where necessary, in a current of air, most of the sulfur dioxid, by the contact action of such substances in the calcined mass as ferric oxid, would be converted into the trioxid. Any residual sulfur dioxid can be used for the production of sulfuric acid by any of the usual processes. I may also pass the fumes evolved by calcining the sulfates over the crude ore material where this would be advantageous and where it would lower the amount of sulfuric acid required. By proceeding in this way I can in many cases obtain more sulfuric acid than I originally used, thus:—

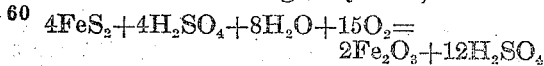

the oxygen being supplied from the air and the water in any of the usual ways for the production of sulfuric acid.

The ore material may in some cases be advantageously subjected to partial calcination or roasting before the treatment with acid.

My process, while primarily applicable to low grade sulfid ores, may also be advantageously applied to other varieties of ore. It is especially valuable in case of poor or refractory ores containing zinc, in most cases with such ores I can obtain practically all the zinc, cadmium and silver in solution as sulfates, while iron, copper, lead etc., are left in the residue as undissolved oxids or insoluble sulfate. In nearly all instances the process enables me to obtain the soluble and insoluble portions in easily utilizable or marketable conditions.

As above described the calcined mass is leached with dilute sulfuric acid or with water. This leaching can be generally expedited by racking the calcined charge while still hot into the leaching reservoirs.

The metals obtained as soluble sulfates may in several cases be put on the market as sulfates, e. g., copper; or they may be converted into other marketable forms, for example, zinc sulfate may be converted into zinc oxid or be employed in the manufacture of litopone or other pigment.

Having now particularly described and ascertained the nature of my said invention and in what manner the same is to be performed, I declare that what I claim is:—

1. The herein described process for the treatment of sulfid ores, which consists in mixing the ore in finely divided condition with sulfuric acid, in amounts determined by the composition of the ore and substantially in the proportion of one molecule of acid to each atom of sulfur present in the ore, calcining the mixture to decompose the unstable sulfates into oxids and to oxidize the sulfur, and leaching out the soluble stable sulfates.

2. The herein described process of treating sulfid ores which consists in mixing with the ore material, in a finely divided condition, sulfuric acid of substantially 60° Baumé, in amount determined by the composition of the ore, and substantially in the proportion of one molecule of acid to each atom of sulfur present in the ore, calcining the mixture with free access of air, to decompose the unstable sulfates into oxids, and to oxidize the sulfur, leaching out the stable sulfates with water, and subsequently leaching out certain of the oxids with acid.

3. The herein described process for treating sulfid ores containing silver, zinc, copper, iron, etc., which consists in mixing with the finely divided ore material, an amount of sulfuric acid of substantially 60° Baumé determined by the composition of the material, and substantially in the proportion of one molecule of acid to each atom of sulfur present in the ore, calcining the mixture with free access of air to decompose the unstable sulfates into oxids and oxidize the sulfur, leaching out the soluble sulfates with water, subsequently leaching out certain of the oxids with sulfuric acid sufficiently weak not to attack other oxids present, and collecting the sulfur oxids for the production of sulfuric acid.

4. The process of treating sulfid ores consisting of the successive steps substantially as hereinbefore described.

ALFRED HOLDSWORTH.

Witnesses:
C. G. REDFERN,
JOHN E. BOUSFIELD.